United States Patent
Okuyama

(10) Patent No.: US 9,573,091 B2
(45) Date of Patent: Feb. 21, 2017

(54) ODOR ABSORBING FILM HAVING SCUFF RESISTANCE

(75) Inventor: Takahide Okuyama, Yamagata (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/239,582

(22) PCT Filed: Aug. 31, 2012

(86) PCT No.: PCT/US2012/053267
§ 371 (c)(1),
(2), (4) Date: Feb. 19, 2014

(87) PCT Pub. No.: WO2013/033488
PCT Pub. Date: Mar. 7, 2013

(65) Prior Publication Data
US 2014/0165844 A1 Jun. 19, 2014

Related U.S. Application Data

(60) Provisional application No. 61/529,439, filed on Aug. 31, 2011.

(51) Int. Cl.
*B01D 53/02* (2006.01)
*B01D 53/04* (2006.01)
(Continued)

(52) U.S. Cl.
CPC .......... *B01D 53/0407* (2013.01); *B32B 27/20* (2013.01); *B32B 27/304* (2013.01); *B44C 1/105* (2013.01); *C09J 7/0296* (2013.01); *B32B 2255/10* (2013.01); *B32B 2255/26* (2013.01); *B32B 2307/758* (2013.01); *B32B 2405/00* (2013.01);
(Continued)

(58) Field of Classification Search
CPC ............ C09J 2427/006; C09J 2431/006; C09J 2205/114; C09J 7/0296; B01D 53/0407; B32B 2255/10; B32B 2255/26; B32B 2307/758; B32B 2405/00; B32B 2451/00; B32B 2607/02; B32B 27/20; B32B 27/304; B44C 1/105
See application file for complete search history.

(56) References Cited

U.S. PATENT DOCUMENTS 5,643,436 A 7/1997 Ogawa
5,643,669 A 7/1997 Tsuei
(Continued)

FOREIGN PATENT DOCUMENTS

EP 1870236 12/2007
JP 07-189120 7/1995
(Continued)

OTHER PUBLICATIONS

International Search Report for PCT International Application No. PCT/US2012/053267, mailed on Jul. 5, 2013, 4pgs.

*Primary Examiner* — Christopher P Jones
(74) *Attorney, Agent, or Firm* — Philip Y. Dahl

(57) ABSTRACT

A decorative sheet includes a decorative base layer; an adhesive layer disposed on a surface of the decorative base layer; and an odor absorbing scuff resistant layer disposed on an opposing surface of the base layer from the adhesive layer. The odor absorbing scuff resistant layer includes an odor absorbing agent and silicone-acrylic particles. The decorative sheet maintains odor absorbing properties while being resistant to scuffs and scratches.

20 Claims, 1 Drawing Sheet

(51) Int. Cl.
    *C09J 7/02*         (2006.01)
    *B32B 27/20*       (2006.01)
    *B32B 27/30*       (2006.01)
    *B44C 1/10*         (2006.01)

(52) U.S. Cl.
    CPC ........ *B32B 2451/00* (2013.01); *B32B 2607/02* (2013.01); *C09J 2205/114* (2013.01); *C09J 2427/006* (2013.01); *C09J 2431/006* (2013.01)

(56) References Cited

U.S. PATENT DOCUMENTS

| | | | |
|---|---|---|---|
| 6,521,553 B1 | 2/2003 | Tabata | |
| 7,306,660 B2 * | 12/2007 | Seto et al. | 96/154 |
| 2009/0246439 A1 | 10/2009 | Kanno | |

FOREIGN PATENT DOCUMENTS

| | | |
|---|---|---|
| JP | 08-230108 | 9/1996 |
| JP | 09-060149 | 3/1997 |
| JP | H10-71680 | 3/1998 |
| JP | 10-095061 | 4/1998 |
| JP | H10-226962 | 8/1998 |
| JP | 11-152824 | 6/1999 |
| JP | 2000-345125 | 12/2000 |
| JP | 2006-348430 | 12/2006 |
| JP | 2007-038576 | 2/2007 |
| JP | 2007-100032 | 4/2007 |
| JP | 2007-224234 | 9/2007 |
| JP | 2008-156876 | 7/2008 |
| JP | 2009-119436 | 6/2009 |

\* cited by examiner

ODOR ABSORBING FILM HAVING SCUFF RESISTANCE

CROSS REFERENCE TO RELATED APPLICATIONS

This application is a national stage filing under 35 U.S.C. 371 of PCT/US2012/053267, filed 31 Aug. 2012, which claims priority to U.S. Provisional Application No. 61/529,439, filed 31 Aug. 2011, the disclosure of which is incorporated by reference in its/their entirety herein.

FIELD

The present disclosure relates to, among other things, decorative films, particularly decorative films capable of absorbing odors.

BACKGROUND

Unpleasant odor and volatile organic compounds (VOC) can be a nuisance and can cause health concerns, particularly in indoor environments. For example, sick building syndrome, which is a combination of ailments associated with an individual's place of work or residence, can be attributed to inadequate ventilation and chemical contaminants With newer building standards requiring improved insulation, air quality often suffers due to, for example, decreased air turnover, which can lead to increased odor and VOCs.

Decorative films having an odor absorbing layer have been proposed to reduce odor, VOCs, or other airborne chemical contaminants These films, such as Di-Noc® sheets (3M Company), may be used as design features for walls, ceilings and the like. A layer of odor absorbing agents, such as inorganic micro-porous fillers, may be disposed on the decorative film, which can then be appropriately placed on, for example, a wall or a ceiling to absorb airborne chemicals. Such odor absorbing decorative films can reduce odors and other nuisance chemicals, improving the well-being of individuals within rooms or buildings in which the films are used. However, decorative films having odor absorbing layers tend to scuff easily. Accordingly, the durability of the decorative and aesthetic aspects of such films tends to be poor.

BRIEF SUMMARY

The present disclosure describes, among other things, scuff resistant decorative films having an odor absorbing layer. The odor absorbing layer includes scuff resistant particles, which improve scuff resistance without substantially decreasing odor absorbing properties.

In embodiments, a decorative sheet is described herein. The decorative sheet includes a decorative base layer; an adhesive layer disposed on a surface of the decorative base layer; and an odor absorbing scuff resistant layer disposed on an opposing surface of the base layer from the adhesive layer. The odor absorbing scuff resistant layer includes an odor absorbing agent and silicone-acrylic particles, and may contain a binder resin. The weight ratios of the odor absorbing agent, silicone-acrylic particles, and binder resin may be controlled to achieve desirable odor absorbing performance and scuff resistance.

In embodiments, a composition for coating a decorative sheet with an odor absorbing scuff resistant layer is described herein. The composition comprises an odor absorbing agent; a binder resin; a solvent for the binder resin; and silicone-acrylic particles. The weight ratio of odor absorbing agent to silicone-acrylic particles is between 7:1 and 1:1. The weight ratio of the binder to the odor absorbing agent is between 1.5:1 and 0.7:1. The weight ratio of the binder to the silicone-acrylic particles is between 10:1 and 1:1.

The devices, articles and methods described herein may provide one or more advantages over prior odor absorbing decorative sheets or films. For example, prior odor absorbing decorative sheets were susceptible to scuffing and scratching, while the odor absorbing decorative sheets described herein are scratch and scuff resistant. Accordingly, the odor absorbing decorative sheets described herein should be durable when used in high traffic areas or locations. In embodiments, the odor absorbing decorative sheets described herein are more scuff resistant than their non-odor absorbing counterparts. These and other advantages of the various embodiments of the devices and methods described herein will be readily apparent to those of skill in the art upon reading the disclosure presented herein.

Figure 1:
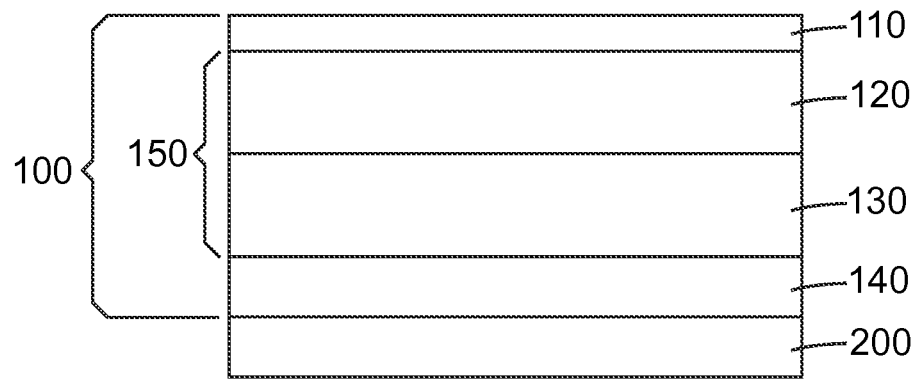
FIG. 1 is a schematic cross-sectional diagram of a system including a release liner and an embodiment of a decorative sheet.

The schematic drawings presented herein are not necessarily to scale. Like numbers used in the figures refer to like components, steps and the like. However, it will be understood that the use of a number to refer to a component in a given figure is not intended to limit the component in another figure labeled with the same number. In addition, the use of different numbers to refer to components is not intended to indicate that the different numbered components cannot be the same or similar.

DETAILED DESCRIPTION

In the following detailed description, reference is made to the accompanying drawings that form a part hereof, and in which are shown by way of illustration several specific embodiments of devices, systems and methods. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like. For example, a coating composition comprising an odor absorbing agent, silicone-acrylic particles, a binder resin, and a solvent may consist of, or consist essentially of, the odor absorbing agent, the silicone-acrylic particles, the binder resin, and the solvent.

"Consisting essentially of", as it relates to a compositions, articles, systems, apparatuses or methods, means that the compositions, articles, systems, apparatuses or methods include only the recited components or steps of the compositions, articles, systems, apparatuses or methods and, optionally, other components or steps that do not materially affect the basic and novel properties of the compositions, articles, systems, apparatuses or methods. For example, decorative sheets described herein have odor absorbing properties and are scuff resistant. Components that significantly detract from the odor absorbance or scuff resistance characteristics of the sheets may be considered, in some cases, to materially affect the basic and novel properties of the sheets.

Any direction referred to herein, such as "top," "bottom," "left," "right," "upper," "lower," "above," below," and other directions and orientations are described herein for clarity in reference to the figures and are not to be limiting of an actual device or system or use of the device or system. Many of the devices, articles or systems described herein may be used in a number of directions and orientations.

The present disclosure describes, among other things, scuff resistant decorative films having an odor absorbing layer. Previously, application of layers of odor absorbing agents to decorative films tends to make the films undesirably susceptible to scratching and scuffing. As described herein, it has been found that incorporation of silicone-acrylic fine particles into the odor absorbing layer can improve scuff resistance without substantially adversely affecting odor absorbing properties. It is believed that the silicone component of the silicone-acrylic particles reduces surface friction and that the acrylic component provides good adhesion within a binder resin in which an odor absorbent agent is dispersed.

It has been found that increased relative amounts of binder resin in the odor absorbing layer results in decreased odor absorbing capacity of the odor absorbing agents. It has also been found that decreased relative amounts of binder resin in the odor absorbing layer results in decreased scuff resistance. The ratio of binder, odor absorbing agent and silicone-acrylic particles may, in various embodiments, be controlled to achieve suitable scuff resistance and odor absorbing properties.

The decorative sheets described herein may be used for any suitable purpose, including but not limited to coverings, accents, or design features for interior or exterior walls, ceilings, floors or the like. Due to the presence of odor absorbing agents in the decorative sheets described herein, the sheets may be advantageously used in environments in which odors, volatile organic compounds or other airborne chemical contaminants are present.

Referring now to FIG. 1, a schematic diagram of a system including a release liner 200 and a decorative sheet 100 is shown. The decorative sheet 100, in the depicted embodiment, includes a decorative base layer 150, an adhesive layer 140 disposed on a surface of the base layer 150, and an odor absorbing scuff-resistant layer 110 disposed on an opposing surface of the base layer from the adhesive layer 140. In embodiments, the odor absorbing scuff resistant layer 110 can include an odor absorbing agent and silicon-acrylic particles. As depicted in FIG. 1, the base layer 150 may include more than one sublayer 120, 130, such as one or more polymeric films.

In embodiments, one sublayer 130 of the base layer 150 is a colored or patterned film, and another sublayer 120 of the base layer is a clear film. Colored or patterned films may be colored or patterned in any suitable manner. For example, a coloring agent or die may be incorporated into a material for forming the film, or a color or pattern may be printed onto a surface of the film to produce the colored or patterned film. The clear film, if employed, is preferably transparent, allowing the color or pattern of the underlying colored or patterned film to be seen. Of course, the clear film, or portions thereof, may be opaque.

Any suitable colored or patterned film or clear film may be employed. In embodiments, the films 120, 130 or base layer 150 are formed from synthetic resins such as polyvinylchloride, polyester, polyolefin resin, or (meth)acrylic resin. Polyvinylchloride resin is readily workable, easily processed, and is relatively inexpensive, making it a good choice for forming the base layer 150 or one or more layers 120, 130 thereof.

If more than one sublayers 120, 130 are used to form base layer 150, the sublayers may be laminated via any suitable process, such as emboss rolling.

The adhesive layer 140 may include any suitable adhesive, such as a pressure sensitive adhesive.

Examples of suitable adhesives include acrylic adhesives, rubber-based adhesives and silicone adhesives. The adhesive may be applied to the base layer 150 via any suitable process. For example, the adhesive may be applied to a surface of a release layer 200 and dry laminated to the surface of the base layer 150.

The odor absorbing scuff resistant layer 110 may be applied to the surface of the base layer 150 in any suitable amount. In embodiments, the odor absorbing scuff resistant layer 110 is applied at a weight of between 5 grams per square meter and 0.5 grams per square meter of the base layer 150 film, such as between 3 grams per square meter and 1 grams per square meter of the base layer film, or about 1.8 grams per square meter of the film. Preferably, the odor absorbing scuff resistant layer 110 is transparent.

As used herein, "transparent" means that objects situated beyond the transparent object or layer are capable of being clearly seen through the transparent object or layer. In the context of decorative films it will be appreciated that the transparent layer may scatter some amount of light while still being considered transparent. For example, if the general decorative features of the base layer 150 are visible through the odor absorbing scuff resistant layer 110, the odor absorbing scuff resistant layer 110 will generally be considered transparent regardless of whether layer 110 scatters light. It will be understood that one or more components of the odor absorbing scuff resistant layer 110 may be non-transparent in bulk, but will be generally transparent at the thicknesses present in a decorative sheet 100.

In embodiments, the odor absorbing scuff resistant layer 110 is opaque or translucent.

The decorative sheet 100 and various layers may be of any suitable thickness. In embodiments, the thickness of the sheet 100 is between 100 microns and 275 microns, between 150 microns and 250 microns, or about 200 microns. In embodiments, the adhesive layer 140 has a thickness of between 20 microns and 60 microns, such as about 40 microns. In embodiments, the base layer 150 has a thickness of between 100 microns and 200 microns, such as between 130 microns and 190 microns or about 160 microns. If the base layer 150 is formed from more than one sublayer 120, 130, the sublayers 120, 130 may have the same or different thicknesses. In embodiments, the sublayers 120, 130 have a thickness of between 40 microns and 160 microns, such as between 60 microns and 100 microns, or about 80 microns. In many cases the thickness of the odor absorbing scuff resistant layer 110 will be difficult to measure due to non-uniformity. In many cases, the thickness of the layer 110 is quite thin, with its thickest parts being defined by the diametric dimension of scuff resistant particles used.

Figure 2:
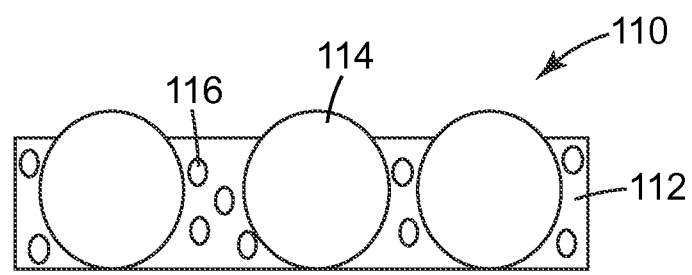
FIG. 2 is a schematic diagram of an embodiment of an odor absorbing scuff resistant coating.

Referring now to FIG. 2, the odor absorbing scuff resistant layer 110 may include a binder 112, an odor absorbing agent 116, and silicone-acrylic fine particles 114. Of course, other components, such as a plasticizer, a stabilizer (such as a heat stabilizer), a UV absorbing agent, or the like may be included in the layer.

Any suitable odor absorbing agent 116 may be used. As used herein, an "odor absorbing agent" is an agent that absorbs noxious or unpleasant odors, volatile organic compounds, or other undesirable nuisance or unhealthy airborne chemicals (collectively referred to herein as airborne chemical contaminants). Examples of airborne chemical contaminants include ammonium; amines; hydrogen sulfide; mercaptans; aldehydes, acetic acid; and the like.

Examples of odor absorbing agents that may be used include but are not limited to agents including an activated carbon or inorganic element, a deodorant such as a polyvinyl amine compound (such as those described in U.S. Pat. No. 6,521,553), phthalocyanine polycarboxylate, a hydrazide compound, or the like. In embodiments, the odor absorbing agent includes a deodorization catalyst for oxidative decomposition of airborne chemical contaminants, such as described in Japanese patent application laid-open (Kokai) No. Hei JP-A-7-189120, or the like. In embodiments, the odor absorbing agent includes Zaoba Super #100 available from DAIWA Chemical Industries Co., Ltd. Of course, any suitable known or developed odor absorbing agent may be used.

Odor absorbing agents typically include activated carbon or a porous inorganic type component and a deodorant compound. Examples of porous inorganic type components include porous substances formed from silicon dioxide, titanium dioxide, zinc oxide, aluminum oxide or the like; porous substances such as zeolite, silica gel, active carbon or the like; organic acid salts such as acetates or citrates; inorganic acid salts such as sulfates or nitrates, chlorides, hydroxides or oxides of metal such as copper, zinc, silver, lead, iron, aluminum, calcium, magnesium, manganese, nickel, cobalt or the like; and the like. The relative amounts of deodorant compound and active carbon or inorganic type porous component may be varied to achieve a desired deodorizing effect as generally known in the art.

Preferably, a synthetic resin is used as a binder for retaining or attaching the odor absorbing agent 116 to the surface of the base layer 150 of the decorative sheet 100. Any suitable resin may be used. Examples of suitable resins include urethane based resins, acrylic based resins, aminoplast resins, vinylchloride based resins, fluopolymer based resins, epoxy based resins, glyoxal based resins, ethylene urea resins and the like. In embodiments, one or more vinyl-chloride-vinylacetate copolymers are used as a binder. Examples of vinyl-chloride-vinylacetate copolymers that may be employed include VAGH and VYHH, available from Dow Chemical Co. (Midland, Mich.).

The binder 112 may also serve to retain the scuff-resistant particles 114. Any suitable scuff-resistant particles 114 may be used. Silicone-acrylic particles have been found to be particularly useful for enhancing scuff resistance. The performance of silicone-acrylic particles was found to be significantly better than acrylic particles (data not shown). It is believed that the silicone component of silicone-acrylic particles reduces surface friction and that the acrylic component provides good adhesion within a binder resin in which an odor absorbent agent is dispersed, particularly if the binder is formed from vinyl-chloride-vinylacetate copolymer resins.

Silicone-acrylic particles may be manufactured according to any suitable process or may be purchased from a supplier, such as Nissin Chemical Co., Ltd. (Japan), which offers silicone-acrylic particles such as Chaline R170S beads having an average particle diameter of about 30 microns. Silicone-acrylic beads may be formed by acrylic modification of polyorganosiloxane obtainable by graft copolymerization of (i) polyorganosiloxane and (meth)acrylic acid ester, (ii) polyorganosiloxane and a mixture of (meth)acrylic acid ester and monomers polymerizable with the (meth) acrylic acid ester, (iii) or the like. In embodiments, silicone acrylic particles are formed as described in JP 2000-345125 or JP 2007-224234. Suitable silicone-acrylic particles may have any suitable diametric dimension. In embodiments, the particles have average diametric dimensions of between about 20 microns and about 50 microns, although smaller or larger particles may be used.

The odor absorbing scuff resistant layer 110 may be deposited on the base layer 150 in any suitable manner. In embodiments, a composition is coated on the base layer 150 via a gravure coater.

In embodiments, a coating composition for forming the odor absorbing scuff resistant layer 110 includes one or more binder resins, one or more solvents for the one or more resins, one or more odor absorbing agent, and silicone-acrylic particles. The composition may include one or more plasticizers, stabilizers (such as heat stabilizers), UV-absorbing agents, or other components as needed or desired. The coating may be applied to the surface of the base layer 150, and dried to remove the solvent to produce the odor absorbing scuff resistant layer 110.

Any suitable solvent may be used. It will be understood that the solvent used may vary depending on the resin employed. By way of example, methyl isobutyl ketone, methyl ethyl ketone, or combinations thereof may be used when vinyl chloride-vinyl acetate copolymer resins are used.

The ratio of binder, silicone-acrylic particles, and odor absorbing agent in the composition, and thus the layer 110, may affect the odor absorbing and scuff resistant properties of the resulting layer 110. For example, it has been found that increasing the relative concentration of binder resin to odor absorbing particle can reduce odor absorbing performance. However, decreasing the relative concentration of binder resin can negatively affect scuff resistance.

In embodiments, the weight ratio of odor absorbing agent to silicone-acrylic particles is between 7:1 and 1:1, such as between 3.3:1 and 1.25:1, or about 1.5:1. In embodiments, the weight ratio of binder resin to odor absorbing particles is between 1.5:1 and 0.7:1, such as between 1.5:1 and 0.7:1, between 1.3:1 and 0.8:1 or between 1.1:1 and 0.9:1. In embodiments, the weight ratio of binder to silicone-acrylic particles is between 10:1 and 1:1, such as between 3.5:1 and 1:1 or between 1.8:1 and 1.2:1.

In embodiments, the weight percentage of the silicone-acrylic particles in layer 110 is 10% or more, 15% or more, 20% or more, or between 20% and 30%. In the Examples, presented herein, to achieve excellent scuff resistance the layer had greater than 20% silicone-acrylic particles, while the layer having about 11% silicone-acrylic particles resulted in good scuff resistance.

In the following, non-limiting examples are presented, which describe various embodiments of the articles and methods discussed above.

EXAMPLES

Films having odor absorbing layer were prepared as follow. Briefly, five different odor absorbing compositions were prepared using the materials described in Table 1. Materials 1-5 described in Table 1 (solvents, plasticizers, and heat stabilizer) were stirred with a T. K. HOMO MIXER at 400-800 rpm. Vinyl chloride-vinyl acetate copolymer resins (Materials 6-7 described in Table 1: VYHH, VAGH, Dow Chemical) were added into the obtained solution with stirring and then stirred with T. K. HOMO MIXER at 1,000-1,200 rpm for 3 hours. To the resulting clear solution, materials 8-11 described in Table 1 (solvents, antiodor agent, and silicone-acrylic copolymer) were added and stirred with T. K. HOMO MIXER at 1,000-1,200 rpm for 15 minutes to obtain the top layer solution.

The obtained top layer solution was coated on an 80 micron thick clear PVC film (available from Tatsuta chemical Co., Ltd, [Tokyo, Japan]) with a gravure coater and dried for 1 minute at 40 degree C. to produce a top coated PVC film. The resulting top layer had weight of 1.8±0.2 grams per square meter of the film. The top layer was very thin, and the thickness was difficult to measure due to protrusion of silicon-acrylic particles.

The top-coated clear PVC film was laminated to an 80 micron thick black pigmented PVC film (available from Bando chemical Co., Ltd, Kobe, Japan) with an emboss roll at 160-170 degree C.

An acrylic PSA (available from Nippon shokubai, Tokyo, Japan]) was coated on a release liner with a knife coater and dried for 5 minutes at 90 degree C. to produce an adhesive layer (40±4 g per square meter) on the liner. The resulting adhesive layer was laminated to the backside of the laminated PVC film to produce gave the samples that were tested.

TABLE 1

Materials used to produce top coat (by weight percent)

| | Materials | | 1 | 2 | 3 | Comp. Ex. 4 | Comp. Ex. 5 |
|---|---|---|---|---|---|---|---|
| 1 | MBK | Solvent | 9 | 9 | 9 | 22 | 9 |
| 2 | MEK | Solvent | 18 | 18 | 18 | 44 | 18 |
| 3 | GIZER PN-250 | Plasticizer | 1 | 1 | 1 | 2 | 1 |
| 4 | TCP | Plasticizer | 1 | 1 | 1 | 2 | 1 |
| 5 | SG-12 | Heat Stabilizer | 1 | 1 | 1 | 2 | 1 |
| 6 | VYHH | Resin | 12 | 10 | 8 | 21 | 13 |
| 7 | VAGH | Resin | 4 | 4 | 3 | 7 | 5 |
| 8 | MIBK | Solvent | 13 | 13 | 13 | 0 | 13 |
| 9 | MEK | Solvent | 26 | 26 | 26 | 0 | 26 |
| 10 | Saoba Super #100 | Anti-odor agent | 13 | 13 | 12 | 0 | 13 |
| 11 | Chaline R-170S | Scuff resistant particle | 2 | 4 | 8 | 0 | 0 |

MIBK: methyl isobutyl ketone (Sankyo Chemical, Aichi, Japan); MEK: methyl ethyl ketone (Sankyo Chemical, Japan); GIZER PN-250: ADEKA (Tokyo, Japan), TGP: tricresyl phosphate (Nippon Rika, Tokyo, Japan); SC-12: ADEKA (Tokyo, Japan); VYHH: vinyl chloride-vinyl acetate copolymer (Dow Chemical, Midland, Michigan); VAGH: vinyl chloride-vinyl acetate copolymer (Dow Chemical, Midland, Michigan); Zaoba Super #100: DAIWA Chemical Industries CO., LTD. (Osaka, Japan); Chaline R-170S: Silicone-acrylic copolymer, Nissin Chemical Industry Co., Ltd. (Fukui, Japan).

The resulting samples were tested for odor absorbing performance and scratch resistance. Briefly, for odor absorbing performance, a 10 cm×28 cm piece of a sample was placed into a 3L TEDLAR BAG (Dupont) into which 500 ml of acetaldehyde gas (80 ppm) was injected. After 24 hour incubation of the sample with the acetaldehyde at 28 degrees C., the residual concentration of acetaldehyde in the bag was measured by a gas detector tube system by GASTEC (Kanagawa, Japan). The odor absorbing % was calculated as follows:

Odor absorbing %=Residual concentration of acetaldehyde gas (ppm)/80×100

For the scratch resistance test, the samples were fixed to an aluminum plate via the pressure sensitive adhesive. The top surface was scratched (back and forth ten times) with a squeegee (PA1: available from Sumitomo 3M Ltd., Tokyo, Japan) with a 1 kg load. The amount of scratching was visually determined as follows:

Fail: Obvious white scratches were observed
Poor: Slight white scratches were observed
Good: Slight gloss changes were observed
Excellent: No scratches were observed The results of the odor and scratch resistance tests are provided in Table 2 below. AS shown in Table 2, scratch resistance is good if no anti-odor agent is present in the top coat (Comp. example 4), and the scratch resistance is very poor (fail) if odor absorbing agent is present without scratch resistant particles (Comp. example 5). However, scratch resistance improves with increasing amounts of scratch resistance particles (Examples 1-3)

TABLE 2

Odor and scratch test results

| | Odor absorbing % | Scratch resistant results |
|---|---|---|
| Example 1 | 88% | Poor |
| Example 2 | 88% | Good |
| Example 3 | 68% | Excellent |
| Comp. example 4 | 28% | Good |
| Comp. example 5 | 88% | Fail |

Thus, embodiments of ODOR ABSORBING FILM HAVING SCUFF RESISTANCE are disclosed. One skilled in the art will appreciate that the films, systems, decorative sheets, compositions, and methods described herein can be practiced with embodiments other than those disclosed. The disclosed embodiments are presented for purposes of illustration and not limitation.

What is claimed is:

1. A decorative sheet comprising:
   a decorative base layer;
   an adhesive layer disposed on a surface of the decorative base layer; and
   an odor absorbing scuff resistant layer disposed on an opposing surface of the base layer from the adhesive layer,
   wherein the odor absorbing scuff resistant layer comprises an odor absorbing agent and silicone-acrylic particles.

2. A decorative sheet according to claim 1, wherein the weight ratio of odor absorbing agent to silicone-acrylic particles is between 7:1 and 1:1.

3. A decorative sheet according to claim 1, wherein the weight ratio of odor absorbing agent to silicone-acrylic particles is between 3.3:1 and 1.25:1.

4. A decorative sheet according to a claim 1, wherein the odor absorbing scuff resistant layer further comprises a binder.

5. A decorative sheet according to claim 4, wherein the weight ratio of the binder to the odor absorbing agent is between 1.5:1 and 0.7:1.

6. A decorative sheet according to claim 4, wherein the weight ratio of the binder to the silicone-acrylic particles is between 10:1 and 1:1.

7. A decorative sheet according to claim 4, wherein the weight ratio of the binder to the silicone-acrylic particles is between 3.5:1 and 1:1.

8. A decorative sheet according to claim 4, wherein the binder comprises one or more vinyl chloride-vinyl acetate copolymers.

9. a decorative sheet according to claim 1, wherein the base layer comprises a colored or patterned film and a clear film.

10. A decorative sheet according to claim 9, wherein the colored or patterned film is laminated to the clear film.

11. A decorative sheet according to claim 9, wherein the colored or patterned film is formed from a material comprising polyvinyl chloride, polyester, a polyolefin resin, and a (meth)acrylic resin; and wherein the clear film is formed from a material comprising polyvinyl chloride, polyester, a polyolefin resin, and a (meth)acrylic resin.

12. A decorative sheet according to claim 9, wherein the colored or patterned film and the clear film are formed from polyvinyl chloride.

13. A decorative sheet comprising:
 a decorative base layer consisting essentially of a colored or patterned layer and clear layer, wherein the colored or patterned layer and the clear layer are formed from polyvinyl chloride films;
 an adhesive layer disposed on a surface of the colored or patterned layer opposite the clear layer; and
 an odor absorbing scuff resist ant layer disposed on a surface of the clear layer opposite the colored or patterned layer, wherein the odor absorbing scuff resistant layer comprises an odor absorbing agent, a binder and silicone-acrylic particles, wherein the weight ratio of odor absorbing agent silicone-acrylic particles is between 3.3:1 and 1.25:1, wherein the weight ratio of the binder to the odor absorbing agent is between 1.3:1 and 0.8:1, and wherein the weight ratio of the binder to the silicone-acrylic particles is between 3.5:1 and 1:1.

14. A system comprising a decorative film according to claim 13 and a release liner disposed on the adhesive layer on a surface opposite the base layer.

15. A decorative sheet according to claim 9 wherein the odor absorbing scuff resistant layer further comprises a binder.

16. A decorative sheet according to claim 15, wherein the binder comprises one or more vinyl chloride-vinyl acetate copolymers.

17. A decorative sheet according to claim 11 wherein the odor absorbing scuff resistant layer further comprises a binder.

18. A decorative sheet according to claim 17, wherein the binder comprises one or more vinyl chloride-vinyl acetate copolymers.

19. A decorative sheet according to claim 12 wherein the odor absorbing scuff resistant layer further comprises a binder.

20. A decorative sheet according to claim 19, wherein the binder comprises one or more vinyl chloride-vinyl acetate copolymers.

* * * * *

UNITED STATES PATENT AND TRADEMARK OFFICE
CERTIFICATE OF CORRECTION

PATENT NO. : 9,573,091 B2
APPLICATION NO. : 14/239582
DATED : February 21, 2017
INVENTOR(S) : Takahide Okuyama It is certified that error appears in the above-identified patent and that said Letters Patent is hereby corrected as shown below:

In the Specification

Column 1
Line 26, delete "contaminants" and insert -- contaminants. --, therefor.
Line 32, delete "contaminants" and insert -- contaminants. --, therefor.

Column 5
Line 55, delete "fluopolymer" and insert -- fluoropolymer --, therefor.

In the Claims

Column 9
Line 1, in Claim 4, delete "to a" and insert -- to --, therefor.
Line 16, in Claim 9, delete "a" and insert -- A --, therefor.
Line 32, in Claim 13, delete "and" and insert -- and a --, therefor.

Column 10
Line 3, in Claim 13, delete "resist ant" and insert -- resistant --, therefor.
Line 8, in Claim 13, delete "agent" and insert -- agent to --, therefor.

Signed and Sealed this
Twenty-eighth Day of November, 2017

Joseph Matal
*Performing the Functions and Duties of the
Under Secretary of Commerce for Intellectual Property and
Director of the United States Patent and Trademark Office*